United States Patent
Lim et al.

(10) Patent No.: US 12,511,205 B2
(45) Date of Patent: Dec. 30, 2025

(54) MEMORY FAILURE PREDICTION AND MITIGATION

(71) Applicant: Micron Technology, Inc., Boise, ID (US)

(72) Inventors: Su Wei Lim, Bayan Lepas (MY); Senthil Murugan Thangaraj, Fremont, CA (US); Marco Sforzin, Cernusco sul Naviglio (IT); Daniele Balluchi, Cernusco sul Naviglio (IT); Massimiliano Patriarca, Milan (IT); Giorgio Servalli, Fara Gera d'Adda (IT); Angelo Visconti, Appiano Gentile (IT); Antonino Capri', Bergamo (IT); Garth N. Grubb, Boise, ID (US); Amitava Majumdar, Boise, ID (US); Miguel Mares, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/678,557

(22) Filed: May 30, 2024

(65) Prior Publication Data
US 2024/0403177 A1    Dec. 5, 2024

(30) Foreign Application Priority Data
May 30, 2023   (MY) ............... PI 2023003222

(51) Int. Cl.
*G06F 11/20*   (2006.01)
*G06F 11/14*   (2006.01)

(52) U.S. Cl.
CPC ........ *G06F 11/2084* (2013.01); *G06F 11/141* (2013.01)

(58) Field of Classification Search
CPC ............... G06F 11/141; G06F 11/2084; G11C 29/4401; G11C 29/52; G11C 29/70;
(Continued)

(56) References Cited

U.S. PATENT DOCUMENTS

2011/0099458 A1    4/2011  Reche et al.
2016/0055056 A1*   2/2016  Son ..................... G06F 11/1068
                                                     714/764
(Continued)

FOREIGN PATENT DOCUMENTS

WO         2024249669        12/2024

OTHER PUBLICATIONS

"International Application Serial No. PCT US2024 031730, International Search Report mailed Sep. 24, 2024", 3 pages.
(Continued)

*Primary Examiner* — Larry T Mackall
(74) *Attorney, Agent, or Firm* — Schwegman Lundberg & Woessner, P.A.

(57) ABSTRACT

Correctable error pattern information for a memory device can be based on data received from or using a data pin of the memory device. The memory device can include, for example, a DRAM device comprising an array of memory cells. Based on the error pattern information, firmware or software can be used to identify respective physical portions of the array comprising data with correctable errors. In an example, one or more fault locations in the memory device can be identified, the fault location corresponding to multiple cells in the array and comprising the data with correctable errors. In response to identifying the fault location in the array, one or more memory pages corresponding to the location(s) can be offlined or removed from an addressable memory space. In an example, the memory device comprises a portion of a compute express link (CXL) system.

18 Claims, 7 Drawing Sheets

(58) Field of Classification Search
CPC .......... G11C 29/832; G11C 2029/0409; G11C 2029/0411
See application file for complete search history.

(56) References Cited

U.S. PATENT DOCUMENTS

| | | |
|---|---|---|
| 2016/0110125 A1 | 4/2016 | Orme et al. |
| 2021/0089225 A1 | 3/2021 | Boyd |
| 2021/0165721 A1 | 6/2021 | Blagodurov et al. |
| 2022/0050603 A1* | 2/2022 | Zhou .................... G06F 3/0679 |
| 2023/0350588 A1* | 11/2023 | Trantham .............. G06F 3/0689 |

OTHER PUBLICATIONS

"International Application Serial No. PCT US2024 031730, Written Opinion mailed Sep. 24, 2024", 4 pages.
Xiaoming, Du, "Fault-Aware Prediction-Guided Page Offlining for Uncorrectable Memory Error Prevention", IEEE 39th International Conference on Computer Design (ICCD), (Oct. 24-27, 2021), pp. 456-463.

* cited by examiner

MEMORY FAILURE PREDICTION AND MITIGATION

PRIORITY STATEMENT

This application is related to and claims priority to Malaysia Patent Application No. PI 2023003222, filed on May 30, 2023, and entitled "Memory Failure Prediction", the entirety of which is incorporated herein by reference.

BACKGROUND

A memory device (e.g., comprising a DRAM DIMM or other memory circuit) can be removed from a server and placed into a different server or system, such as an upgraded server or system. In an example, the system can comprise a portion of a Compute Express Link (CXL) system.

Over time, memory devices can accumulate errors. Some errors can be correctable (e.g., correctable error, or CE), such as with an error correcting code (ECC), and some errors can be uncorrectable (e.g., uncorrectable error, or UE). In some examples, device circuitry faults or die array errors are responsible for CE and UE events.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various reliability, availability, and serviceability (RAS) mechanisms can be used to prolong a useful life of a memory device or of portions of a memory device. In an example, a reactive RAS mechanism can be configured to observe data input/output pin activity and, in response to detected correctable error (CE) events, attempt to correct the error. Such a correction can include using an error correcting code (ECC), replay, or other solution. When a single error or multiple errors cannot be corrected, it is considered an uncorrectable error (UE). In some examples, simple errors or CE can aggregate or accumulate over time to become more complex errors, and in such cases, the error can stretch beyond correction capability of the ECC and lead to UE.

The present inventor has recognized that a problem to be solved includes identifying error trends or error patterns before uncorrectable errors occur. In an example, the solution can include or use pattern information about detected correctable errors or CE events in particular physical areas of a memory die or array. In response to identifying a CE pattern, such as a CE pattern that is known or suspected to give rise to later UE events, the solution can include triggering a page repair or offlining (e.g., removing from service) particular pages with errors, or pages that are likely to contain future errors. Accordingly, remediation efforts can be implemented in hardware and/or software. The correctable error pattern information can include, for example, information about a count of correctable errors (e.g., such as can be represented using a histogram) associated with particular physical regions of an internal array of a memory device.

The systems and methods discussed herein can include or use predictive fault analysis. The analysis can include proactively predicting UE events and responsively performing, or triggering, page repair actions or page offlining to thereby avoid device or system downtime or other fault conditions. In an example, the solutions discussed herein can help prevent minor or simple errors such as CE events from aggregating to more complex errors or UE events over time, and can help maintain usable memory remain within the capability of ECC correction.

In some examples, if a CE event is observed (e.g., at or using information from one or more of the input/output pins, or DQ pins, of the memory device) corresponding to a particular memory row, column, and bank address, then an entire page (e.g., a 4 KB page) corresponding to the address can be offlined or removed from service, such as to prevent future UE events. In some examples, repair or other remediation can be performed in response to a CE event, such as in coordination with offlining the page. However, the portion of the failed or failing page can correspond to a physical array row that is susceptible to further errors due to circuit failures, and that same row may comprise information associated with one or multiple other pages. Therefore, offlining only the page corresponding to a particular detected error may be insufficient to prevent future UE events because other bits in the same physical row, which may correspond to other memory pages, may be susceptible to failure. In other words, if a particular row fails, then multiple memory pages may be affected because a physical row in the memory array can translate to multiple different pages used by the operating system.

Memory device manufacturers use proprietary, complex algorithms to translate or map memory bank, column, and row addresses at the memory interface to particular internal memory array addresses. The translation can help improve device security and avoid susceptibility to row hammer attacks. In an example, an interleaving technique can be used to translate host physical address (HPA) to die memory locations. When a particular host tries to read a particular memory page (e.g., a 4 KB page), a first group of 64 bytes can be retrieved from a first memory channel (e.g., channel 0), a second group of 64 bytes can be retrieved from a second memory channel (e.g., channel 1), and so on, where the memory channels correspond to physically different and sometimes non-consecutive locations in the memory array. Other locations in the first memory channel can be mapped to other HPAs. Thus, if a problem exists in, e.g., a row corresponding to the first memory channel, then multiple different HPA memory pages can be affected. A solution can include proactively offlining each of the multiple pages to avoid future UE events.

In a particular example, a memory device includes DRAM comprising an array of cells with respective capacitors that store the charge or bit value in each cell. A word line activates a particular row of cells that share the same word line. If a word line fails in the circuit then all the bit cells sharing the same word line will fail. This is called row based failure. In another example, a bit line failure involves a failure of all the bit cells corresponding to the same column. Information about whether particular bits share the same row or column is generally proprietary information that memory device manufacturers do not share for security reasons. Furthermore, the bit mapping for a particular device cannot generally be deciphered from DQ pin activity alone. In other words, a row address on a particular DQ pin may not necessarily correspond to a row in the internal array. A solution to these problems can include using manufacturer-specific information about mappings between DQ pins and internal array locations to monitor row failure patterns and then proactively trigger repair (e.g., including PPR routines or page offlining) to thereby help avoid UE events. A failure pattern generally refers to a specific pattern of errors or faults detected in particular memory cells (or in rows, columns, or other regions) of a memory device array. The failure pattern can indicate a particular type of failure mode or likelihood of uncorrectable errors.

In an example, memory devices discussed herein comprise a portion of a system that uses a Compute Express Link (CXL) interconnect. A CXL memory device can include a memory controller and device-attached memory, such as DRAM or other volatile or non-volatile memory. The CXL memory device with on-board memory controller can be configured to perform ECC algorithms and, with a priori or manufacturer-specific information about the internal architecture of the device-attached memory, can be configured to perform fault analyses and track CE activity to thereby improve runtime UE prediction and remediation functions.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor, or multiple processors); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

Figure 1:
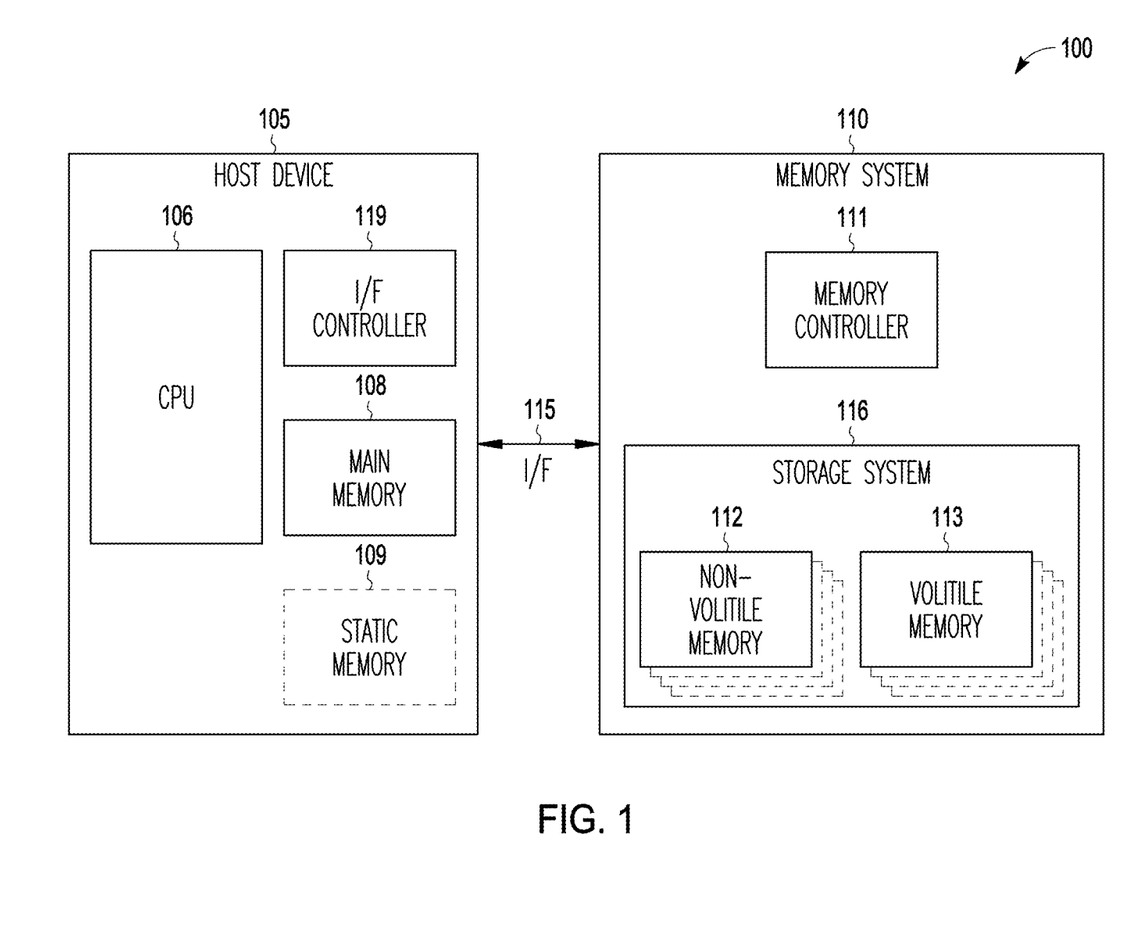
FIG. 1 illustrates generally an example of a host device coupled to a memory system.

FIG. 1 illustrates an example system (e.g., a host system) 100 including a host device 105 and a memory system 110 and/or storage system 116 configured to communicate over a communication interface (I/F) 115 (e.g., a bidirectional parallel or serial communication interface). The host device 105 can include a host processor 106 (e.g., a host central processing unit (CPU) or other processor or processing device) or other host circuitry (e.g., a memory management unit (MMU), an I/F controller 119, etc.). In some examples, the host device 105 can include a main memory 108 (e.g., DRAM, etc.) and optionally, a static memory 109, to support operation of the host processor 106.

The memory system 110 can include a universal flash storage (UFS) device, an embedded MMC (eMMC™) device, or one or more other memory devices. For example, if the memory system 110 includes a UFS device, the communication interface 115 (I/F) can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the memory system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the memory system 110 can include one or more other memory devices, or the communication interface 115 can include one or more other interfaces, depending on the host device 105 and the memory system 110. In an example, the host device 105 and the memory system 110 comprise portions of a CxL system.

In an example, the memory system 110 comprises a CXL storage system 116. The CXL storage system 116 can include one or both of non-volatile memory 112 and volatile memory 113. The CXL storage system 116 includes a high-capacity link between the memory controller 111 and the CXL storage system 116. To access the CXL storage system 116, the host device 105 sends instructions to the I/F controller 119 that routes a CXL request to the memory controller 111. The host device 105 may also include higher latency memory 117 having lower bandwidth than the CXL memory.

In an example, the memory controller 111 can include, among other things, circuitry or firmware, such as a number of components or integrated circuits associated with various memory management functions. For purposes of the present description example memory operation and management functions will be described in the context of DRAM memory; other types of memory (e.g., NAND) can similarly be used. Persons skilled in the art will recognize that other forms of volatile or non-volatile memory may have analogous memory operations or management functions. Such management functions include wear leveling (e.g., garbage collection or reclamation), error detection or correction, block retirement, or one or more other memory management functions. The memory controller 111 can parse or format host commands (e.g., commands received from a host) into device commands (e.g., commands associated with operation of a memory array, etc.), or generate device commands (e.g., to accomplish various memory management functions) for components of the memory system 110.

In NAND-based implementations, the memory controller 111 can include or use management tables configured to maintain various information associated with one or more component of the memory system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the error can be referred to as an uncorrectable error or UE. The management tables can maintain a count of correctable or uncorrectable errors, among other things.

An array controller can include, among other things, circuitry or components configured to control memory operations associated with writing data to, reading data from, or erasing one or more memory cells of the storage system 116 coupled to the memory controller 111. The memory operations can be based on, for example, host commands received from the host device 105, or internally generated by the memory controller 111 (e.g., in association with wear leveling, error detection or correction, etc.).

The array controller can include an error correction code (ECC) component that can include, among other things, an ECC engine or other circuitry configured to detect or correct errors associated with writing data to or reading data from one or more memory cells of the storage system 116. The memory system 110 can be configured to actively detect and recover from error occurrences (e.g., bit errors, operation errors, etc.) associated with various operations or storage of data, while maintaining integrity of the data transferred between the host device 105 and the memory system 110, or maintaining integrity of stored data (e.g., using redundant storage, etc.), and can remove (e.g., retire) failing memory resources (e.g., memory cells, memory arrays, pages, banks, blocks, etc.) to prevent future errors.

Figure 2:
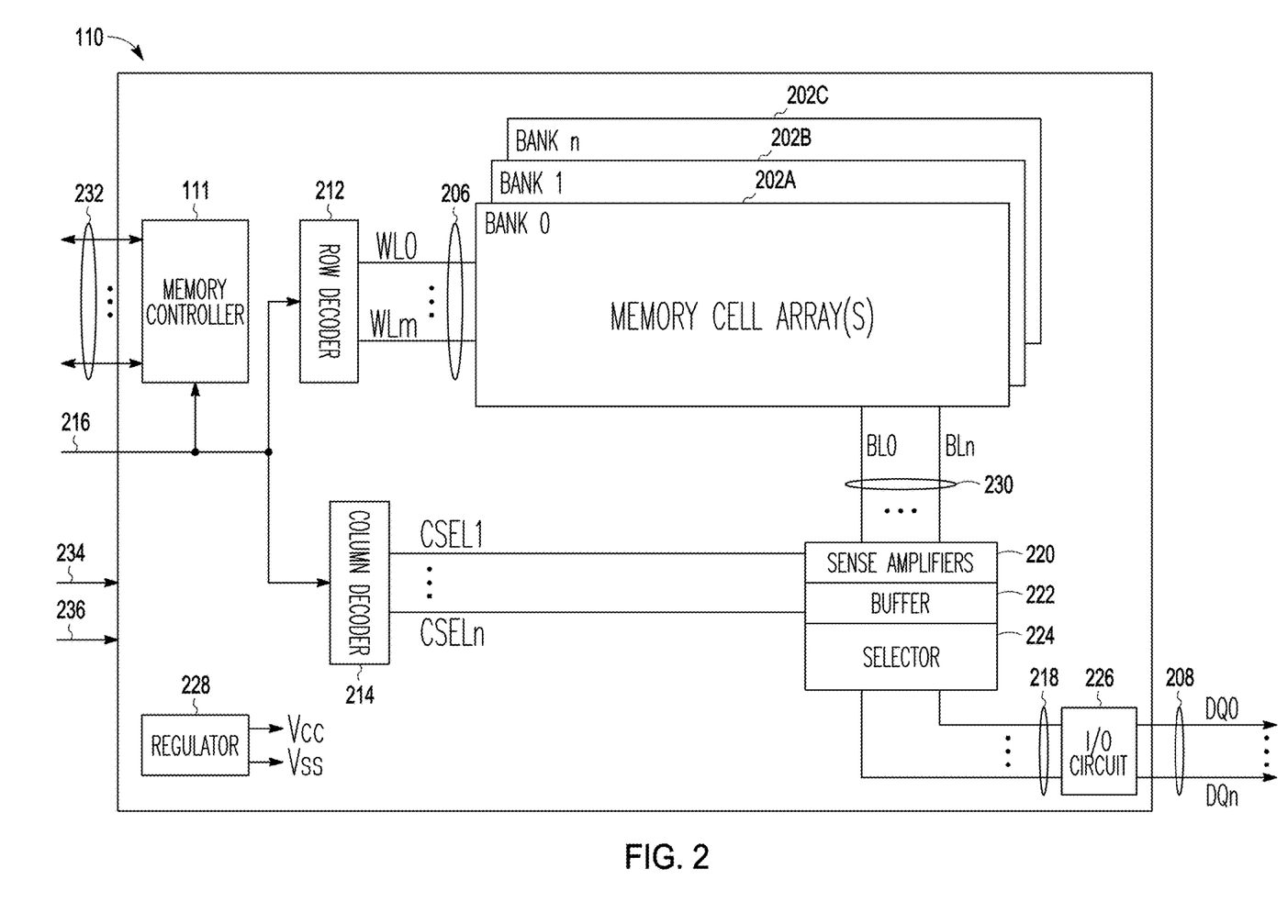
FIG. 2 illustrates generally a block diagram of an example memory device.

FIG. 2 illustrates an example block diagram of portions of the memory system 110 including a DRAM-based system with a memory array having a plurality of memory cells, and one or more circuits or components to provide communication with, or perform one or more memory operations on, the memory array. The memory array can comprise a portion of the storage system 116 or, in some examples, the higher latency memory 117. The example of the memory system 110 can include a row decoder 212, a column decoder 214, sense amplifiers 220, a buffer 222, a selector 224, an input/output (I/O) circuit 226, and the memory controller 111.

The memory cells of the memory array can be arranged in banks, such as a first bank 202a, a second bank 202b, and an nth bank 202c. Although illustrated herein as having three banks, more or fewer banks (sub-banks, ranks, etc.) can similarly be used. In examples, the memory cells can be arranged in a number of rows, columns, banks, pages, etc., and can be accessed using, for example, access lines 206, first data lines 230, or one or more select gates, source lines, etc.

The memory controller 111 can control memory operations of the memory system 110 according to one or more signals or instructions received on control lines 232, including, for example, one or more clock signals or control signals that indicate a desired operation (e.g., write, read, erase, etc.), or address signals (A0-AX) received on one or more address lines 216. One or more devices external to the memory system 110 can control the values of the control signals on the control lines 232, or the address signals on the address line 216. Examples of devices external to the memory system 110 can include, but are not limited to, a host, a memory controller, a processor, or one or more circuits or components not illustrated in FIG. 2.

The memory system 110 can use access lines 206 and first data lines 230 to transfer data to (e.g., write or erase) or from (e.g., read) one or more of the memory cells in the array. The row decoder 212 and the column decoder 214 can receive and decode the address signals (A0-AX) from the address line 216, can determine which of the memory cells are to be accessed, and can provide signals to one or more of the access lines 206 (e.g., one or more of a plurality of word lines (WL0-WLm)) or the first data lines 230 (e.g., one or more of a plurality of bit lines (BL0-BLn)), such as described above.

The memory system 110 can include sense circuitry, such as the sense amplifiers 220, configured to determine the values of data on (e.g., read), or to determine the values of data to be written to, the memory cells using the first data lines 230. For example, in a selected string of memory cells 204, one or more of the sense amplifiers 220 can read a logic level in the selected memory cell 204 in response to a read current flowing in the memory array through the selected string to the data lines 230.

One or more devices external to the memory system 110 can communicate with the memory system 110 using the I/O lines (DQ0-DQN) 208, address lines 216 (A0-AX), or control lines 232. The input/output (I/O) circuit 226 can transfer values of data in or out of the memory system 110, such as in or out of the buffer 222 or the memory array, using the I/O lines 208, according to, for example, the control lines 232 and address lines 216. The buffer 222 can store data received from the one or more devices external to the memory system 110 before the data is programmed into relevant portions of the memory array, or can store data read from the memory array before the data is transmitted to the one or more devices external to the memory system 110.

The column decoder 214 can receive and decode address signals (A0-AX) into one or more column select signals (CSEL1-CSELn). The selector 224 (e.g., a select circuit) can receive the column select signals (CSEL1-CSELn) and select data in the buffer 222 representing values of data to be read from or to be programmed into memory cells 204. Selected data can be transferred between the buffer 222 and the I/O circuit 226 using second data lines 218.

The memory controller 111 can receive positive and negative supply signals, such as a supply voltage (Vcc) 234 and a negative supply (Vss) 236 (e.g., a ground potential), from an external source or supply (e.g., an internal or external battery, an AC-to-DC converter, etc.). In certain examples, the memory controller 111 can include a regulator 228 to internally provide positive or negative supply signals.

Returning to the example system 100 of FIG. 1, the memory system 110 can include the memory controller 111 and multiple types of memory cells. In an example, the memory can include one or both of non-volatile memory 112 and volatile memory 113, and can include a number of memory devices (e.g., dies or logical units (LUNs)) each including peripheral circuitry thereon, and controlled by the memory controller 111. In an example, the non-volatile memory 112 can include one or more flash memory devices and the volatile memory 113 can include dynamic random access memory (DRAM). Different types of memory cells or memory arrays can provide different page sizes, or may use different amounts of metadata associated therewith. For example, different memory device types may have different bit error rates, which can lead to different amounts of metadata used to ensure integrity of the page of data (e.g., a memory device with a higher bit error rate may use more bytes of error correction code data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, faults or error pattern information can be based on information received from one or more Data Input or Data Output (DQ) pins, or input/output pins, of a memory device, such as the memory system 110 of FIG. 1. A page can include all the memory cells that share a row address and are accessed by a particular DQ pin. During a write operation, a voltage can be applied to a DQ pin. The voltage can be translated into an appropriate signal and stored in the selected memory cell. During a read operation, data read from a selected memory cell is provided at the corresponding DQ pin when output is enabled. Most of the time, the DQ pins are in a high impedance state and they do not source or sink any current, and therefore they do not present a signal to the system. In an example, an internal memory array can comprise a row and column structure. A row can be common to multiple bits, such as 724 bits, 4096 bits, or more. In some examples, bits from the same row can be mapped to multiple different memory pages such as can be addressable by a host. In an example, a number of pages (e.g., all column addresses on a row) on a memory device can be equal to the number of rows times the number of DQ pins. Each page can be as few as two bits or as many bits as the number of column addresses being accessed (e.g., 724 bits or more).

Figure 3:
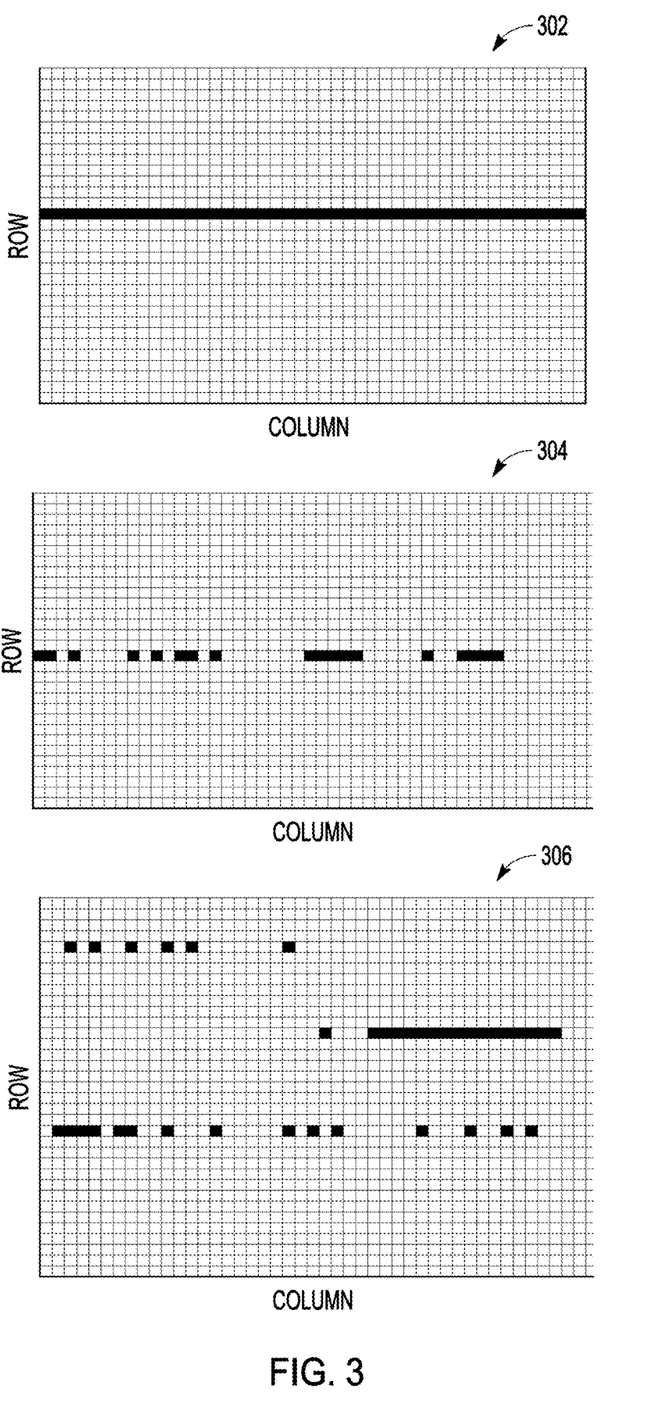
FIG. 3 illustrates generally examples of different fault modes for an array of memory cells.

FIG. 3 illustrates generally examples of different fault mode charts for an array of memory cells that comprise the memory system 110. For example, a first fault mode chart 302 shows a first fault mode that involves an error across all columns of a particular row of memory cells in the memory system 110. The first fault mode, or first failure pattern, may be due to a worldline driver failure, among other things. The first fault mode can generally be associated with uncorrectable error(s) and memory pages that include or use cells associated with the particular row may be unusable. In response to detecting or identifying the first failure pattern, the memory pages associated with the particular row can be offlined or repairs can be attempted.

A second fault mode chart 304 shows a second fault mode that involves an error across some but not all columns of a particular row. The example of the second fault mode may be associated with correctable error(s) and/or uncorrectable error(s) that occur in cells belonging to the particular row. In some examples, the second fault mode, or second failure pattern, may indicate a trend toward or a likelihood of future uncorrectable errors associated with the particular row. In response to detecting or identifying the second failure pattern, the memory pages associated with the particular row can be repaired or, if repairs are unsuccessful, the pages can be offlined.

A third fault mode chart 306 shows a third fault mode that involves errors in three separate rows. The example of the third fault mode may be associated with correctable error(s) and/or uncorrectable error(s) that occur in cells belonging to respective different rows. In some examples, the third fault mode, or third failure pattern, may indicate a trend toward or a likelihood of future uncorrectable errors associated with one or more of the three separate rows. In some examples, the third failure pattern indicates present or future uncorrectable error associated with one or multiple memory pages. In response to detecting or identifying the third failure pattern, the memory pages associated with some or all of the affected rows can be repaired or, if repairs are unsuccessful, the pages can be offlined.

Other fault modes can similarly be illustrated, such as errors involving consecutive rows, or pervasive errors that involve an entire bank of memory cells, among others. Repair or remediation (e.g., including offlining) actions can be performed depending on the extent and type of fault detected.

Figure 4:
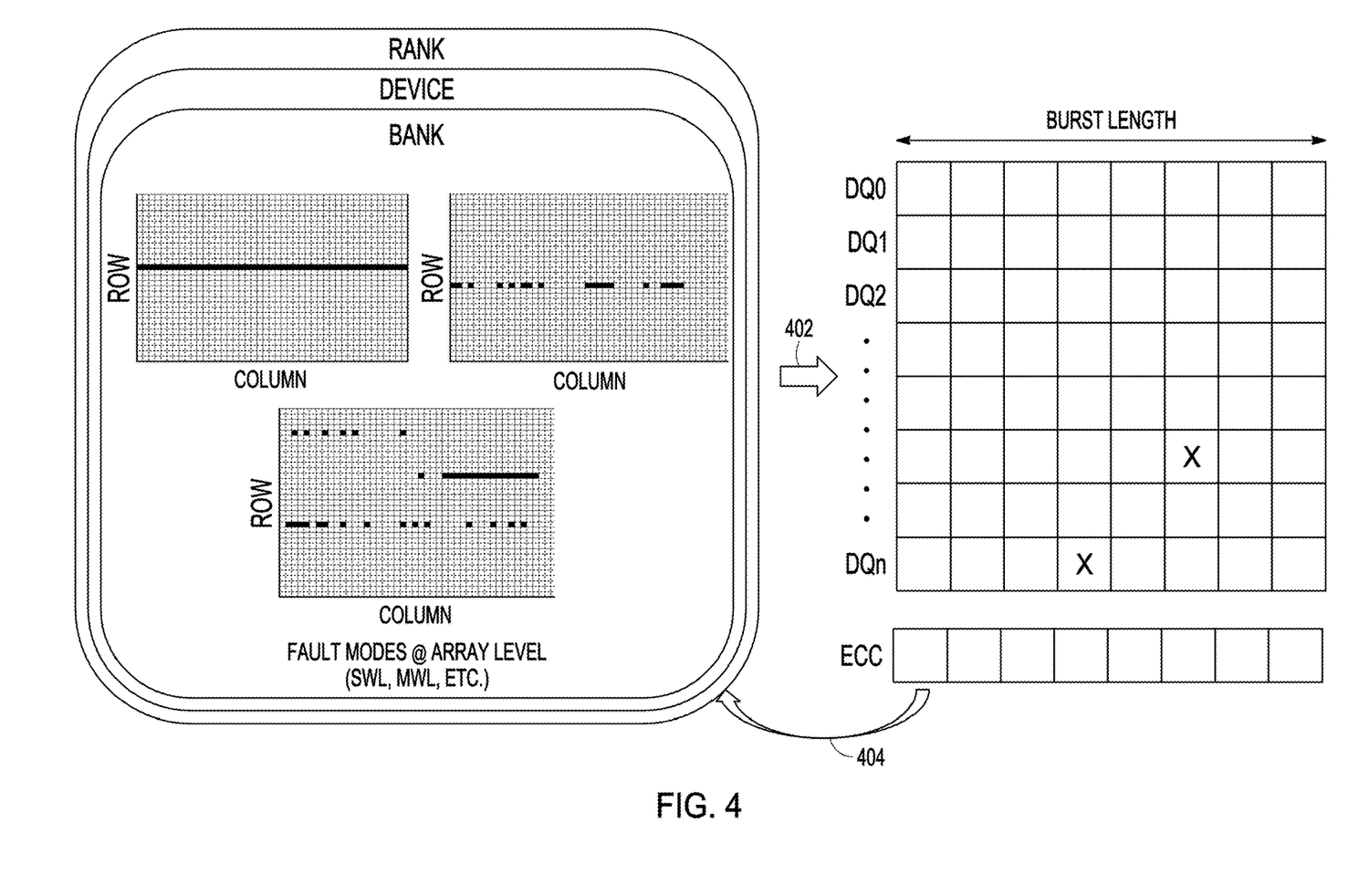
FIG. 4 illustrates generally an example of different fault modes and a representation of interface pin activity for a memory device.

FIG. 4 illustrates generally an example of different fault modes and a representation of interface pin (DQ pin) activity for a memory device. FIG. 4 illustrates generally at left, the different fault modes from the example of FIG. 3 associated with a particular rank, device, and bank of a memory device, and at right, a notional representation of DQ pin activity for multiple DQ pins of a memory device and a particular 64 byte data burst. The fault modes may correspond to single wordline errors, multiple wordline errors, or other error types.

The present inventor has recognized that a failure on a particular DQ pin may not directly correspond to a particular row or column of a memory cell of the error. In other words, a mapping between DQ pins and locations in the matrix of internal memory array cells may be indirect. In an example, a failure or error detected at a particular DQ pin may implicate multiple rows or columns.

A first mapping 402 from the device fault information to pin activity may be used to aggregate information about DQ pin activity and attempt to correlate such activity with errors or physical faults. For example, the first mapping 402 can include or use a machine learning-based approach to identify correlations between detected locations of correctable errors and DQ pin information.

However, the present inventor has recognized that a more efficient and more effective method for identifying error locations can include or use a priori information, or known, proprietary information, about an architecture of a particular memory device, that relates error information received from particular DQ pins with particular locations in an array. That is, the method can include or use such a priori information to correlate information detected on DQ pins to different fault modes or fault locations (cell locations) in an array.

For example, DQ pin information (e.g., about one or more correctable errors) can be related to particular fault modes by performing a reverse mapping from an interface address (e.g., such as a bank, row, or column address) to an internal array map and then observing the failure pattern at the array level. In an example, a solution can include or use a second mapping 404, such as alternatively or additionally to the first mapping 402, to more accurately identify locations of physical faults or internal errors in cells of a memory die.

In an example, the correctable error information, received via one or more DQ pins, can be recorded and tracked over time, such as together with the internal array location information, to monitor CE event progression and identify problematic or failed internal memory array locations (e.g., rows and/or columns). As more failure events occur over time, such as in the same or additional locations, a fault mode pattern can develop (see, e.g., the fault modes illustrated in FIG. 3), and accordingly corrective action can be taken to avoid future UE events or other fatal errors.

Figure 5:
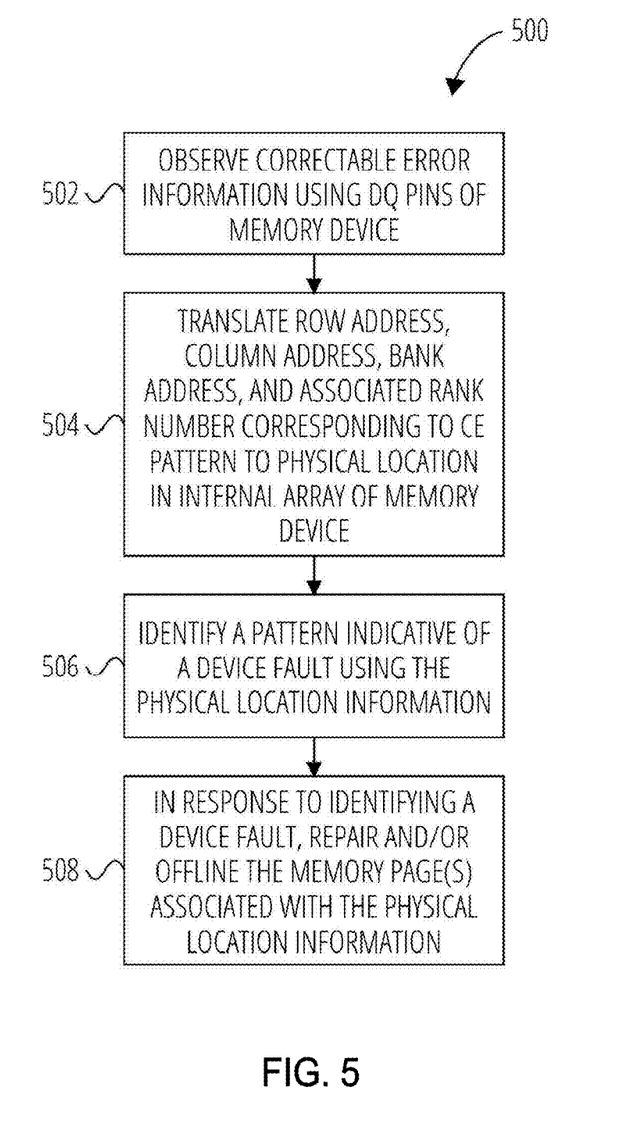
FIG. 5 illustrates generally an example of a method that can include selectively offlining one or more pages of memory corresponding to a particular fault mode.

FIG. 5 illustrates generally an example of a method 500 that can include identifying errors in a particular memory device and, in response, performing a mitigating action. At operation 502, the method includes observing correctable error information on or using one or more DQ pins of a memory device, such as the memory system 110. The error information can include, e.g., CE event information, such as detected using an ECC algorithm, when data is read from a first host physical address (HPA) associated with the memory device. In an example, the operation 502 includes receiving information about correctable errors from the DQ pins using a memory controller. The memory controller can include or use another storage location to store information about a count of the correctable errors observed, such as together with information about the particular pin from which the correctable error was observed.

At operation 504, the method includes translating a row address, column address, bank address, and/or associated rank number corresponding to the CE pattern (observed at operation 502) to one or more physical locations in the internal array of the memory device. For example, the physical locations can include particular rows and/or columns in one or more arrays of a matrix within a bank of the memory device. In other words, the operation 504 can include identifying particular memory cells or cell locations in a memory device that correspond to the information about the correctable errors received at the operation 502.

At operation 504, translating the error information to the physical locations can be based on information about the internal architecture of the memory device. Such information can include a mapping between device bank, row and column addresses, and the associated DQ pin(s) and physical structures of the dies that comprise the memory device.

In an example, the operation 504 can include or use a software-implemented failure analysis tool that comprises mapping or translation information for the particular memory device. In an example, the operation 504 includes receiving, at the failure analysis tool, information about the memory device itself (e.g., row address, bank address, column address, etc.) and information about the behavior of the memory device, such as information about the CE location indicated by DQ pin number and a burst length number for a particular DQ pin. The failure analysis tool then analyzes the information together at operation 506. In an example, the failure analysis tool comprises an algorithm performed by or using a memory controller for the memory device.

At operation 506, the method includes identifying a pattern indicative of a device fault, or a failure pattern, using the physical location information from operation 504. In an example, identifying a failure pattern includes identifying a physical row or column associated with one or multiple CE events or UE events. In an example, operation 506 includes monitoring fault or error information over time and identifying error trends or error accumulation that corresponds to particular structures (e.g., cells) or structural regions of the dies. For example, the operation 506 can include counting a number of correctable error events associated with a particular cell, and then using information about the count for each of multiple cells to identify a pattern. The operation 506 can include storing the error count or pattern information, for example, in SRAM or flash memory coupled to the memory device, such as using a histogram data structure that relates a count of errors or error events to respective cells.

In an example, the operation 506 can include identifying the failure pattern using some or all of the detected error events. For example, the operation 506 can include determining the failure pattern based on cells for which multiple correctable errors were identified, and excluding cells for which one or less correctable errors were identified. In other words, at least a threshold number of errors may be used, in some examples, to determine a failure pattern.

Various techniques can be used to detect or identify a failure pattern at the operation 506. For example, data analysis techniques can be applied to identify clusters of cells with errors or to identify particular specified patterns of cells with errors within a matrix of available cells. In response to recognizing specified cell failure patterns, a mitigating response can be triggered.

One example of a data analysis technique is K-means clustering, which can include an unsupervised machine learning algorithm configured to cluster information about the memory cells based on their error counts into groups exhibiting similar failure behavior. The cluster centers can be used to reveal failure patterns. Another example can include hierarchical clustering that can be used to build a hierarchy of clusters based on distance measures. A dendrogram can be used to identify memory cell clusters with high error counts, pointing to failure regions. Another example can include DBSCAN (Density-Based Spatial Clustering of Applications with Noise). DBSCAN can be configured to find clusters of adjacent (or near adjacent) memory cells with high error counts, ignoring outliers, and the cluster can be used to indicate failure patterns. Other examples can include or use a random forest classifier, a convolutional neural network, or an anomaly detection algorithm to identify anomalous cells or array regions with abnormally high error counts.

At operation 508, when a device fault is identified at operation 506, then a corrective action or mitigation action can be taken, such as to avoid using problematic or faulty areas of a die. For example, the operation 508 can include offlining the memory page(s) that correspond to the physical location of the error. In an example, multiple memory pages can be offlined, including pages that may not have been accessed using the first HPA at operation 502. Additionally or alternatively to offlining the memory pages, repair operations can be performed, such as using other resources on the memory device.

In a particular example, the operation 506 includes identifying a particular row of a bank of the memory device, and the row indicates multiple correctable errors that may lead to uncorrectable error. At the operation 508, a mitigating operation can include offlining one or multiple addressable memory pages. Each of the offlined memory pages can comprise information that is stored in different cells of the array that correspond to the particular row.

In an example, offlining a memory page can include various steps or procedures. For example, the operation 508 can include identifying a target page address or addresses to be offlined based on the failure analysis. This could be a page number, bank, block, row, and/or column address. Next, the memory controller firmware or registers can be updated to mark the target page as "offline" or "bad." This can involve setting a flag or attribute bit for that page address. The memory management data structures (e.g. page tables) can be modified to unmap the virtual address that points to the target physical page address to thereby make the OS unaware of the offlined page. Next, DRAM refresh operations can be performed for the rows corresponding to the offlined page to ensure data is retained in unused and known-good rows. Next, ECC bits and metadata for the remapped page can be updated to maintain data integrity. Finally, the offlined page address can be recorded in a log file or non-volatile storage for future reference, and an OS memory manager can be notified that memory capacity has changed and can be instructed to adjust as needed.

In an example, the method 500 can be implemented at least in part using a controller of a CXL device (e.g., a Type 2 or Type 3 device). For example, a memory device controller can be configured to perform any or all of operation 502 through operation 508.

A memory device with a controller configured to perform the method 500 (e.g., using firmware or RTL) can thus be configured to perform its own failure analysis, predict UE events, and take preemptive actions (such as offlining particular pages susceptible to errors) before a UE event occurs.

Figure 6:
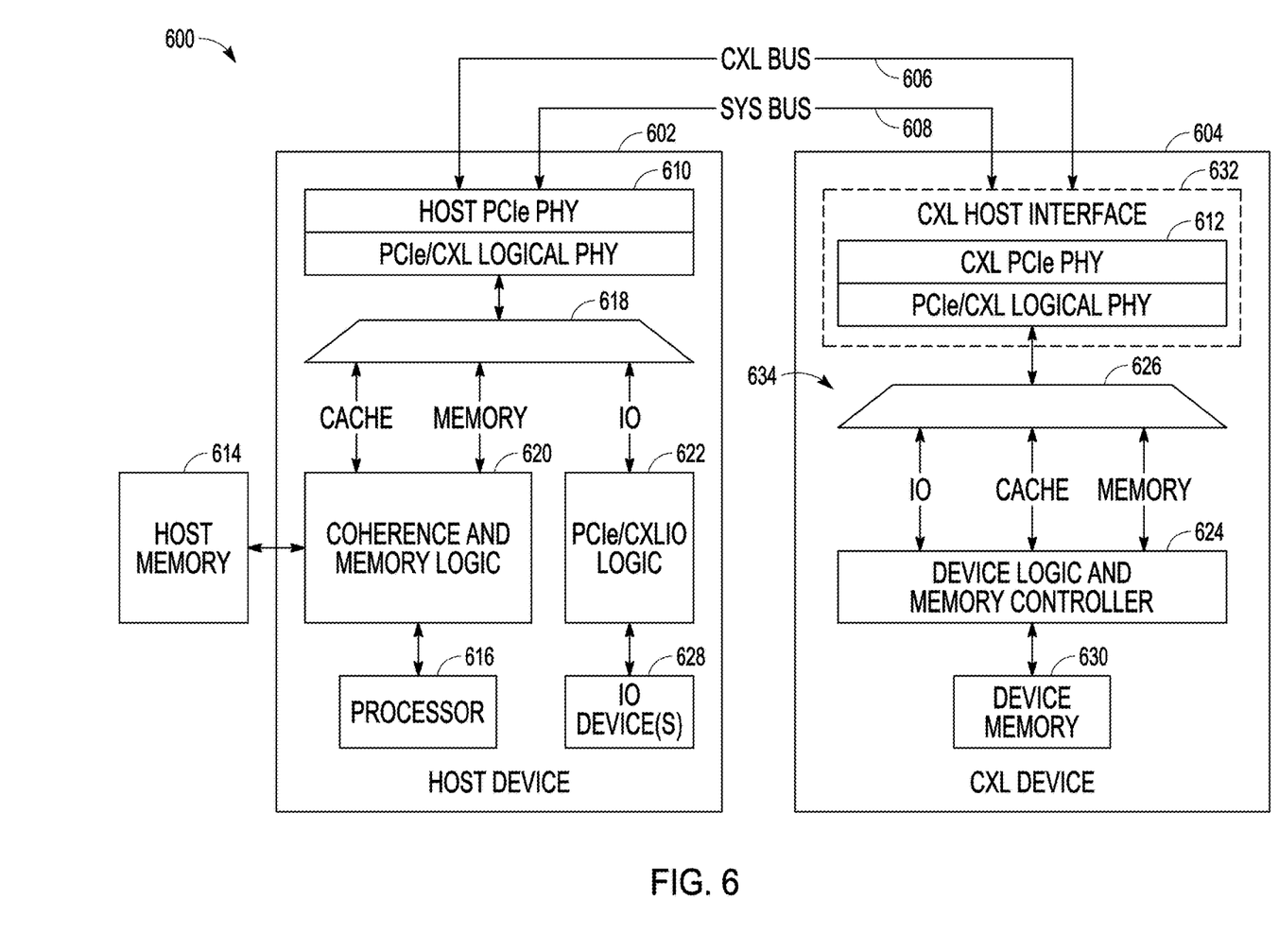
FIG. 6 illustrates generally an example of a compute express link (CXL) system.

FIG. 6 illustrates generally an example of a C×L system 600 that uses a bus system, including a CXL link bus 606 and a system management bus 608, to connect a host device 602 and a CXL device 604. In an example, the host device 602 comprises or corresponds to the host device 105 and the CXL device 604 comprises or corresponds to the memory system 110, or a system comprising the memory system 110, from the example of the environment 100 in FIG. 1.

In an example, the system management bus 608 (e.g., corresponding to a portion of the interface coupling the host device 105 and the memory system 110 from the example of FIG. 1) is configured to support out-of-band communications between the host device 602 and the CXL device 604. In various examples, the CXL link bus 606 or the system management bus 608 can carry miscellaneous commands or events using various protocols, such as link speed changes, reset commands issued by the host, and other reliability, availability, and serviceability features.d In an example, the CXL link bus 606 (e.g., corresponding to a portion of the interface coupling the host device 105 and the memory system 110 from the example of FIG. 1) can support communications using multiplexed protocols for caching (e.g., CXL.cache), memory accesses (e.g., CXL.mem or CXL.memory), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 614) using a request and response protocol. CXL.memory can enable the host device 602 to use memory attached to the CXL device 604, for example, in or using a virtualized memory space. The CXL-based memory device can include or use a volatile or non-volatile memory such as can be characterized by different speeds or latencies. In an example, the CXL-based memory device can include a CXL-based memory controller configured to manage transactions with the volatile or non-volatile memory.

In an example, CXL.memory transactions can be memory load and store operations that run downstream from or outside of the host device 602. CXL memory devices can have different levels of complexity. For example, a simple CXL memory system can include a CXL device that includes, or is coupled to, a single media controller, such as a memory controller (MEMC). A moderate CXL memory system can include a CXL device that includes, or is coupled to, multiple media controllers. A complex CXL memory system can include a CXL device that includes, or is coupled to, a cache controller (and its attendant cache) and to one or more media or memory controllers.

In the example of FIG. 6, the host device 602 includes a host processor 616 (e.g., comprising one or more CPUs or cores) and IO device(s) 628. The host device 602 can comprise, or can be coupled to, host memory 614. The host device 602 can include various circuitry or logic configured to facilitate CXL-based communications and transactions with the CXL device 604. For example, the host device 602 can include coherence and memory logic 620 configured to implement transactions according to CXL.cache and CXL.memory semantics, and the host device 602 can include PCIe logic 622 configured to implement transactions according to CXL.io semantics. In an example, the host device 602 can be configured to manage coherency of data cached at the CXL device 604 using, e.g., its coherence and memory logic 620.

The host device 602 can further include a host multiplexer 618 configured to modulate communications over the CXL link bus 606 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures may use different solutions, which in turn can compromise backward compatibility. CXL can address this problem by consolidating the coherency function at the host device 602, such as using the coherence and memory logic 620.

CXL devices can include devices with various different architectures and capabilities. For example, a Type 1 CXL device can be a device configured to implement a fully coherent cache without host management. Transaction types used with Type 1 devices can include device-to-host (D2H) coherent transactions and host-to-device (H2D) snoop transactions, among others. A Type 2 CXL device, such as can include or use an attached high-bandwidth memory, can be configured to optionally implement coherent cache and can be host-managed. CXL.cache and CXL.mem transactions are generally supported by Type 2 devices. A Type 3 CXL device, such as can include a memory expander for the host, can be configured to include or use host-managed memory. A Type 3 device supports CXL.mem transactions.

The CXL device 604 can include various components or logical blocks including a CXL upstream port 632 and a device management system 634. In an example, the CXL upstream port 632 can be configured to receive and manage various requests and transactions. For example, the CXL upstream port 632 can be configured to receive and communicate PCIe resets such as using PERST (PCI Express Reset), Hot Reset, FLR (function level reset), and CXL resets. In an example, the CXL upstream port 632 can be configured to receive and communicate DOE Transaction layer packets. In an example, the CXL upstream port 632 can be configured to handle side-band requests or other miscellaneous events from PCIe and CXL devices, such as using the CXL link bus 606 or the system management bus 608.

The CXL upstream port 632 can include or use multiple CXL interface physical layers 612. The device management system 634 can include, among other things, the device logic and memory controller 624. In an example, the CXL device 604 can comprise a device memory 630, or can be coupled to another memory device. The CXL device 604 can include various circuitry or logic configured to facilitate CXL-based communications and transactions with the host device 602 using the CXL link bus 606. For example, the device logic and memory controller 624 can be configured to implement transactions received using the CXL upstream port 632 according to CXL.cache, CXL.memory, and CXL.io semantics. The CXL device 604 can include a CXL device multiplexer 626 configured to control communications over the CXL link bus 606.

In an example, one or more of the coherence and memory logic 620, the device management system 634, and the device logic and memory controller 624 comprises a Unified Assist Engine (UAE) or compute fabric with various functional units such as a command manager (CM), Threading Engine (TE), Streaming Engine (SE), Data Manager or data mover (DM), or other unit. The compute fabric can be reconfigurable and can include separate synchronous and asynchronous flows.

The device management system 634 or the device logic and memory controller 624 or portions thereof can be configured to operate in an application space of the C×L system 600 and, in some examples, can initiate its own threads or sub-threads, which can operate in parallel and can optionally use resources or units on other CXL devices 604. Queue and transaction control through the system can be coordinated by the CM, TE, SE, or DM components of the UAE. In an example, each queue or thread can map to a different loop iteration to thereby support multi-dimensional loops. With the capability to initiate such nested loops, among other capabilities, the system can realize significant time savings and latency improvements for compute-intensive operations.

Figure 7:
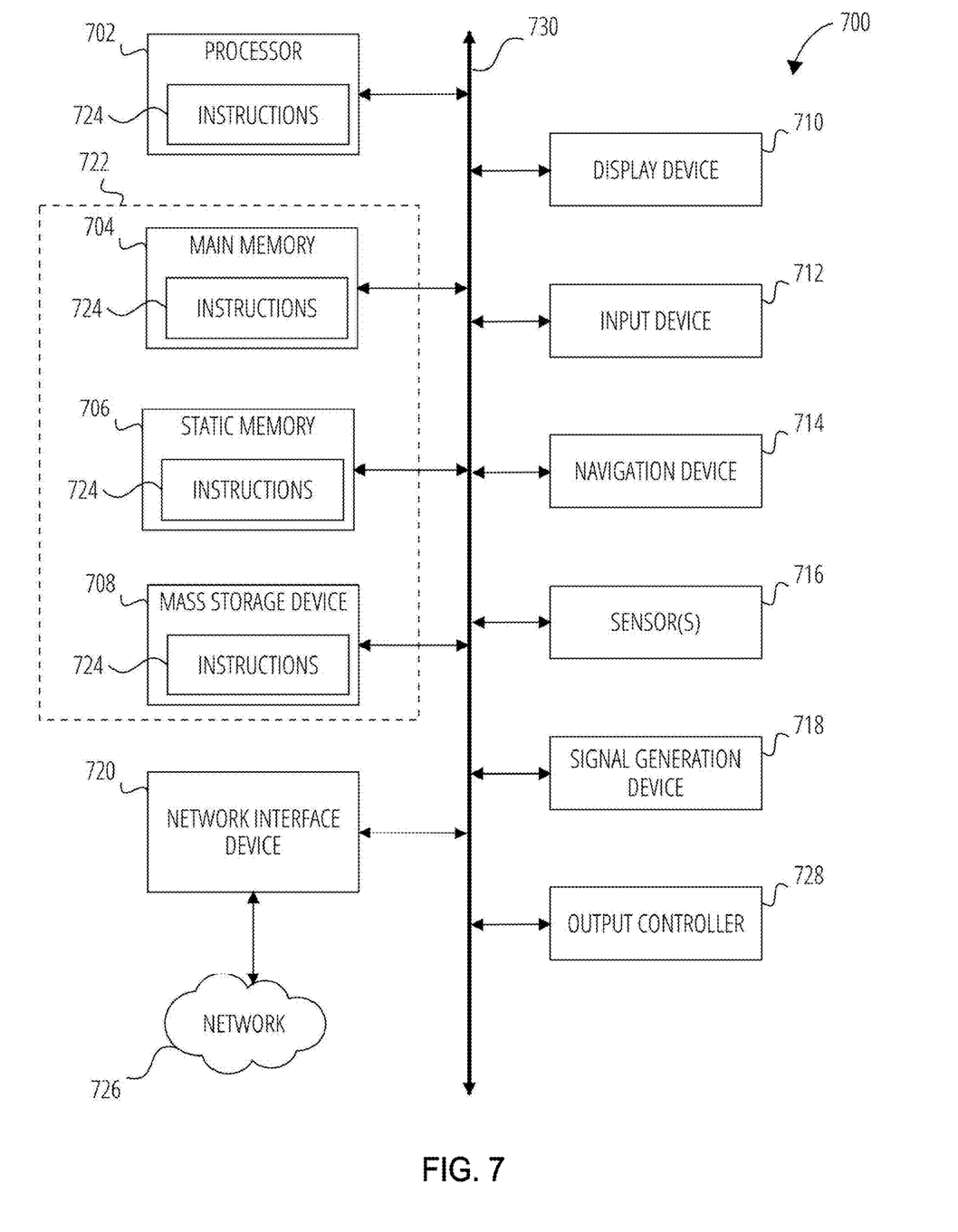
FIG. 7 illustrates a block diagram of an example machine with which, in which, or by which any one or more of the techniques discussed herein can be implemented.

FIG. 7 illustrates a block diagram of an example machine 700 with which, in which, or by which any one or more of the techniques (e.g., methodologies) discussed herein can be implemented, such as for memory failure prediction or mitigation of UE events. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership (e.g., as belonging to a host-side device or process, or to an accelerator-side device or process) can be flexible over time. Circuitries include members that can, alone or in combination, perform specified operations when operating. In an example, hardware of the circuitry can be immutably designed to carry out a specific operation (e.g., hardwired) for example using a memory controller (e.g., the memory controller 115), or using a specific command execution unit thereof. In an example, the hardware of the circuitry can include variably connected physical components (e.g., command execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Any one or more of the components of the machine 700 can include or use one or more instances of the host device 602, the CXL device 604, or other component in or appurtenant to the environment 100 or other system. The machine 700 (e.g., computer system) can include a hardware processor 702 (e.g., a central processing unit (CPU), a graphics processing unit (GPU), a hardware processor core, or any combination thereof), a main memory 704, a static memory 706 (e.g., memory or storage for firmware, microcode, a basic-input-output (BIOS), unified extensible firmware interface (UEFI), etc.), and mass storage device 708 or memory die stack, hard drives, tape drives, flash storage, or other block devices) some or all of which can communicate with each other via an interlink 730 (e.g., bus). The machine 700 can further include a display device 710, an alphanumeric input device 712 (e.g., a keyboard), and a user interface (UI) Navigation device 714 (e.g., a mouse). In an example, the display device 710, the input device 712, and the UI navigation device 714 can be a touch screen display. The machine 700 can additionally include a mass storage device 708 (e.g., a drive unit), a signal generation device 718 (e.g., a speaker), a network interface device 720, and one or more sensor(s) 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 702, the main memory 704, the static memory 706, or the mass storage device 708 can be, or include, a machine-readable media 722 on which is stored one or more sets of data structures or instructions 724 (e.g., software) embodying or used by any one or more of the techniques or functions described herein. The instructions 724 can also reside, completely or at least partially, within any of registers of the hardware processor 702, the main memory 704, the static memory 706, or the mass storage device 708 during execution thereof by the machine 700. In an example, one or any combination of the hardware processor 702, the main memory 704, the static memory 706, or the mass storage device 708 can constitute the machine-readable media 722. While the machine-readable media 722 is illustrated as a single medium, the term "machine-readable medium" can include a single medium or multiple media (e.g., a centralized or distributed database, or associated caches and servers) configured to store the one or more instructions 724.

The term "machine-readable medium" or "processor-readable medium" can include any medium that is capable of storing, encoding, or carrying instructions for execution by the machine 700 or other processor circuit and that cause the machine 700 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine-readable media 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine-readable media 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

To illustrate the methods and apparatuses discussed herein, a non-limiting set of Example embodiments are set forth below as numerically-identified Examples.

Example 1 is a method comprising: receiving information about correctable errors from a data input/output (DQ) pin of a memory device; identifying memory cell locations in the memory device corresponding to the received information about the correctable errors; identifying a failure pattern using information about the memory cell locations; and in response to identifying the failure pattern, offlining one or more addressable memory pages corresponding to the memory cell locations in the memory device.

In Example 2, the subject matter of Example 1 includes determining a count of correctable errors for each of the memory cell locations, wherein identifying the failure pattern includes using the count.

In Example 3, the subject matter of Example 2 includes storing information about the count of correctable errors using a histogram that relates a number of correctable errors detected with a particular row and column of an array of the cells of the memory device.

In Example 4, the subject matter of Examples 2-3 includes receiving the count of correctable errors via a Compute Express Link (CXL) interconnect that couples the memory device to a host device.

In Example 5, the subject matter of Examples 1-4 includes identifying the failure pattern, including identifying a row failure pattern corresponding to a particular row of memory cells in the memory device.

In Example 6, the subject matter of Example 5 includes identifying the memory cell locations in the memory device, including identifying each of multiple memory pages that corresponds to the particular row of cells in the memory device.

In Example 7, the subject matter of Examples 1-6 includes identifying the memory cell locations in the memory device, including using a priori memory device information about a mapping between the correctable errors observed at the DQ pin of the memory device and particular memory cells of the memory device.

In Example 8, the subject matter of Examples 1-7 includes identifying the failure pattern including identifying a particular row of a bank, and wherein offlining the one or more addressable memory pages includes offlining multiple pages, wherein each of the multiple pages comprises information stored in different cells corresponding to the particular row.

In Example 9, the subject matter of Examples 1-8 includes receiving the information about correctable errors including receiving the information from error correcting code (ECC) logic, wherein the memory device comprises the ECC logic.

In Example 10, the subject matter of Examples 1-9 includes receiving the information about correctable errors including receiving the information about correctable errors for a DRAM memory device.

Example 11 is a system comprising: a memory controller; and a memory device comprising an array of memory cells; wherein the controller is configured to: receive correctable error information based on data from a data pin of the memory device; based on the correctable error information, identify one or more memory cells of the array that comprise data with correctable errors; identify a first addressable portion of the memory device that corresponds to multiple cells in the array and comprises the data with correctable errors; and offline one or more memory pages corresponding to the first addressable portion of the memory device.

In Example 12, the subject matter of Example 11 includes the controller is configured to receive the correctable error information over time and count a number of correctable errors associated with respective ones of the memory cells, and the controller is configured to use the count to determine when to offline the one or more memory pages of the memory device.

In Example 13, the subject matter of Example 12 includes an SRAM or flash memory device configured to store the correctable error information and the count.

In Example 14, the subject matter of Examples 11-13 includes the memory device comprising a DRAM device.

In Example 15, the subject matter of Examples 11-14 includes the memory controller configured to receive commands for the memory device from a host device via a Compute Express Link (CXL) interconnect.

In Example 16, the subject matter of Example 15 includes the host device.

In Example 17, the subject matter of Examples 11-16 includes the memory controller configured to identify the memory cells of the array that comprise the data with correctable errors using a priori memory device information about a mapping between correctable errors observed at the data pin and a matrix of particular memory cells of the memory device.

In Example 18, the subject matter of Examples 11-17 includes the controller configured to identify the first addressable portion of the memory device based on information about a cluster of detected correctable errors associated with a particular memory device page.

Example 19 is a non-transitory processor-readable storage medium, the processor-readable storage medium including instructions that when executed by a processor circuit, cause the processor circuit to: receive information about correctable errors from a data input/output (DQ) pin of a memory device; identify memory cell locations in the memory device corresponding to the received information about the correctable errors; identify a failure pattern using information about the memory cell locations; and in response to identifying the failure pattern, offline one or more addressable memory pages corresponding to the memory cell locations in the memory device.

In Example 20, the subject matter of Example 19 includes instructions that when executed by the processor circuit, cause the processor circuit to: identify the failure pattern as a row failure pattern corresponding to a particular row of memory cells in the memory device; and using a priori information about a mapping between the correctable errors observed at the DQ pin of the memory device and particular cells of the memory device, identify each of multiple memory pages that corresponds to the particular row of the memory cells in the memory device.

Example 21 is at least one machine-readable medium including instructions that, when executed by processing circuitry, cause the processing circuitry to perform operations to implement of any of Examples 1-18.

Example 22 is an apparatus comprising means to implement of any of Examples 1-20.

Example 23 is a system to implement of any of Examples 1-20.

Each of these non-limiting Examples can stand on its own, or can be combined in various permutations or combinations with one or more of the other examples discussed herein.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated.

In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
receiving information about correctable errors from a data input/output (DQ) pin of a memory device;
identifying memory cell locations in the memory device corresponding to the received information about the correctable errors;
identifying a failure pattern using information about the memory cell locations;
determining a count of correctable errors for each of the memory cell locations, wherein identifying the failure pattern includes using the count; and
in response to identifying the failure pattern, offlining one or more addressable memory pages corresponding to the memory cell locations in the memory device.

2. The method of claim 1, comprising storing information about the count of correctable errors using a histogram that relates a number of correctable errors detected with a particular row and column of an array of the cells of the memory device.

3. The method of claim 1, comprising receiving the count of correctable errors via a Compute Express Link (CXL) interconnect that couples the memory device to a host device.

4. The method of claim 1, wherein identifying the failure pattern includes identifying a row failure pattern corresponding to a particular row of memory cells in the memory device.

5. The method of claim 4, wherein identifying the memory cell locations in the memory device includes identifying each of multiple memory pages that corresponds to the particular row of cells in the memory device.

6. The method of claim 1, wherein identifying the memory cell locations in the memory device includes using a priori memory device information about a mapping between the correctable errors observed at the DQ pin of the memory device and particular memory cells of the memory device.

7. The method of claim 1, wherein identifying the failure pattern includes identifying a particular row of a bank, and wherein offlining the one or more addressable memory pages includes offlining multiple pages, wherein each of the multiple pages comprises information stored in different cells corresponding to the particular row.

8. The method of claim 1, wherein receiving the information about correctable errors includes receiving the information from error correcting code (ECC) logic, wherein the memory device comprises the ECC logic.

9. The method of claim 1, wherein receiving the information about correctable errors includes receiving the information about correctable errors for a DRAM memory device.

10. A system comprising:
a memory controller; and
a memory device comprising an array of memory cells;
wherein the controller is configured to:
receive correctable error information based on data from a data pin of the memory device;
based on the correctable error information, identify one or more memory cells of the array that comprise data with correctable errors;
identify a first addressable portion of the memory device that corresponds to multiple cells in the array and comprises the data with correctable errors; and
offline one or more memory pages corresponding to the first addressable portion of the memory device, wherein:
the controller is configured to receive the correctable error information over time and count a number of correctable errors associated with respective ones of the memory cells, and
the controller is configured to use the count to determine when to offline the one or more memory pages of the memory device.

11. The system of claim 10, further comprising an SRAM or flash memory device configured to store the correctable error information and the count.

12. The system of claim 10, wherein the memory device comprises a DRAM device.

13. The system of claim 10, wherein the memory controller is configured to receive commands for the memory device from a host device via a Compute Express Link (CXL) interconnect.

14. The system of claim 13, comprising the host device.

15. The system of claim 10, wherein the memory controller is configured to identify the memory cells of the array that comprise the data with correctable errors using a priori memory device information about a mapping between correctable errors observed at the data pin and a matrix of particular memory cells of the memory device.

16. The system of claim 10, wherein the controller is configured to identify the first addressable portion of the memory device based on information about a cluster of detected correctable errors associated with a particular memory device page.

17. A non-transitory processor-readable storage medium, the processor-readable storage medium including instructions that when executed by a processor circuit, cause the processor circuit to:
receive information about correctable errors from a data input/output (DQ) pin of a memory device;
identify memory cell locations in the memory device corresponding to the received information about the correctable errors;
identify a failure pattern using information about the memory cell locations;
determine a count of correctable errors for each of the memory cell locations, wherein identifying the failure pattern includes using the count; and
in response to identifying the failure pattern, offline one or more addressable memory pages corresponding to the memory cell locations in the memory device.

18. The non-transitory processor-readable storage medium of claim 17, comprising instructions that when executed by the processor circuit, cause the processor circuit to:
identify the failure pattern as a row failure pattern corresponding to a particular row of memory cells in the memory device; and
using a priori information about a mapping between the correctable errors observed at the DQ pin of the memory device and particular cells of the memory device, identify each of multiple memory pages that corresponds to the particular row of the memory cells in the memory device.

* * * * *